May 23, 1950    W. S. REYNOLDS    2,508,469
AMMUNITION MAKING MACHINERY
Filed May 15, 1945    7 Sheets-Sheet 1

Fig. 1

INVENTOR.
WARREN S. REYNOLDS
BY
ATTORNEY

May 23, 1950 W. S. REYNOLDS 2,508,469
AMMUNITION MAKING MACHINERY
Filed May 15, 1945 7 Sheets-Sheet 2

INVENTOR.
WARREN S. REYNOLDS
BY
ATTORNEY

May 23, 1950 W. S. REYNOLDS 2,508,469
AMMUNITION MAKING MACHINERY
Filed May 15, 1945 7 Sheets-Sheet 3

Fig. 4

INVENTOR.
WARREN S. REYNOLDS
BY
ATTORNEY

Fig. 5

May 23, 1950 W. S. REYNOLDS 2,508,469
AMMUNITION MAKING MACHINERY
Filed May 15, 1945 7 Sheets-Sheet 5

INVENTOR.
WARREN S. REYNOLDS
BY
ATTORNEY

May 23, 1950 W. S. REYNOLDS 2,508,469
AMMUNITION MAKING MACHINERY
Filed May 15, 1945 7 Sheets-Sheet 6

INVENTOR
WARREN S. REYNOLDS
BY
ATTORNEY

Patented May 23, 1950

2,508,469

UNITED STATES PATENT OFFICE 2,508,469

AMMUNITION MAKING MACHINERY

Warren S. Reynolds, Stratford, Conn., assignor to Remington Arms Company, Inc., Bridgeport, Conn., a corporation of Delaware Application May 15, 1945, Serial No. 593,867

3 Claims. (Cl. 86—10)

This invention relates to a machine for assembling ammunition components and is particularly adaptable for the assembly and manufacture of an electrically operated primer for igniting the propellant charge of small arms or artillery ammunition. The parts to be handled are relatively small, for example, the resistance wire for a 20 mm. cartridge primer is about .002" in diameter, and the outside diameter of the primer body is less than about 0.34" in diameter. The primer must be accurately and uniformly made so as to function properly in the ammunition for which it is designed. These and other objects of the invention will appear from the drawings and the following description which are merely exemplary.

Figure 9:
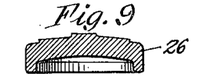
Fig. 9 is a sectional view of the central contact button of a primer.

The primer will first be described and then the general operation of the machine briefly stated. The finished primer assembly seen in Fig. 12 comprises a primer body 25 which may be made of brass, copper, steel, stainless steel, or any suitable material. 26 is the central contact button and 27 is a dielectric cup for electrically insulating button 26 from body 25. The dielectric may be of any suitable insulating material such as "Vinylite," polystyrene, resin impregnated paper, etc. The electrical resistance wire is shown at 28, said wire extending between the dielectric and button at 29 and making contact with the button at this point. The wire 28 lies between the dielectric and primer body at 30 so as to make contact with the primer body. It is thus seen that there is a circuit between primer body 25 and button 26 through electrical resistance wire 28. Button 26 (Fig. 9) may be of a material similar to the primer body, it being desirable that its characteristics be such as to be electrically conductive.

Figure 10:
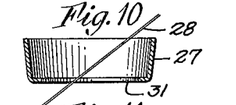
Fig. 10 is a sectional view of the dielectric cup with a wire therein.
Figure 11:
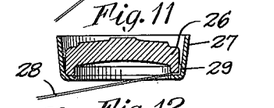
Fig. 11 shows the assembled dielectric cup, wire, and central button of the primer.

Fig. 10 shows the dielectric 27 after it has been cupped and an aperture 31 pierced therein. Wire 28 is shown in its relative position to the cup as it is fed by the wire feeding mechanism prior to placing of the button in the dielectric. The button is assembled to the dielectric so that end 29 of wire 28 will be held between the dielectric and button. This assembly is forced into the upper end of primer body 25 and crimped to the form seen in Fig. 12.

Figure 12:
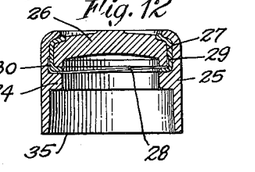
Fig. 12 is a sectional view of a completed primer.

Shoulder or ledge 34 (Fig. 12) is provided for supporting the dielectric and button therein. It is to be understood that the ledge may extend toward the bottom 35 of the primer assembly (not shown), if desired. It has been found preferable, however, to use the construction shown in Fig. 12 so that the body before coning is symmetric and can be fed either end up by a hopper. Fig. 12 shows the upper walls of the primer body coned inwardly and bent to a completed form. The coning operation may take place in two stations as described hereafter but can be done in one operation, if desired.

The final step in the making of the primers is the placing of a suitable priming composition therein adjacent to or surrounding the wire. As described hereafter, the wire may be omitted, the other assembly operations remaining the same.

In use, an electrical contact may be made with the button 26 through the bolt of the gun, the primer body being grounded or otherwise connected to the other side of the source of energy when the circuit is energized. The wire will become heated and ignite the primer composition, as is well known in the art.

It can be seen from the foregoing that a number of operations are necessary in the assembly of the described primer and that for quantity production a suitable machine must be provided to accurately and rapidly assemble said primers. This is accomplished in the present machine by providing two work carrying transfer dials rotating in synchronism to bring the various parts together in an assembling operation. In one transfer dial, the dielectric is blanked from a flat strip at station A and cupped and pierced at a second station B. At a third station C, a button, said dielectric cup, and said wire are brought together and assembled. A wire feeding mechanism is employed to feed wire from a spool and to cut the same at the wire feed station. The dial then carries the assembled dielectric, button, and wire to a final component assembly station D (Figs. 2 and 14), said station being common to the two dials. The second dial has previously had primer bodies fed thereto (station E) and carries said bodies underneath said final component assembly station D. A punch at this point then moves the button, dielectric, and wire assembly from the first dial into the primer body held in the second dial. The second dial then carries the assembled parts to a coning station F where the upper part of the primer body is coned inwardly. The final staking or closing operation can then be performed at the next station G. The completed primer is then transferred to a size and eject station H, where a punch forces the primer through a die which sizes it as it is ejected from the second transfer dial. It is to be understood, of course, that various sequences of operations may be used, or different components may be assembled. The machine provides various adjusting means and devices for making the machine suitable for the assembly in quantity of accurately sized and made primers.

Dielectric feed

The dielectric is fed from a roll (not shown) through a feed pipe or guide (not shown) to a roller 37 (Figs. 1, 2 and 17), said roller being rotated a predetermined amount for each feeding operation. A roll 38 is pivoted on arm 39 and spring-urged by spring 40 (Fig. 1) against feed roll 37 so as to cause the dielectric to be frictionally engaged by roll 37. Dielectric 28 is fed over plate 41 (Fig. 17) under the blanking punch 42 (Figs. 1 and 17), said punch cooperating with blanking die aperture 43 in plate 41 and serving to deposit a blanked circular piece of dielectric in one of the apertures 44 of button and dielectric assembly dial 45, said dial having a suitable recess 46 (Figs. 8 and 17) to hold the blanked dielectric.

Figure 2:
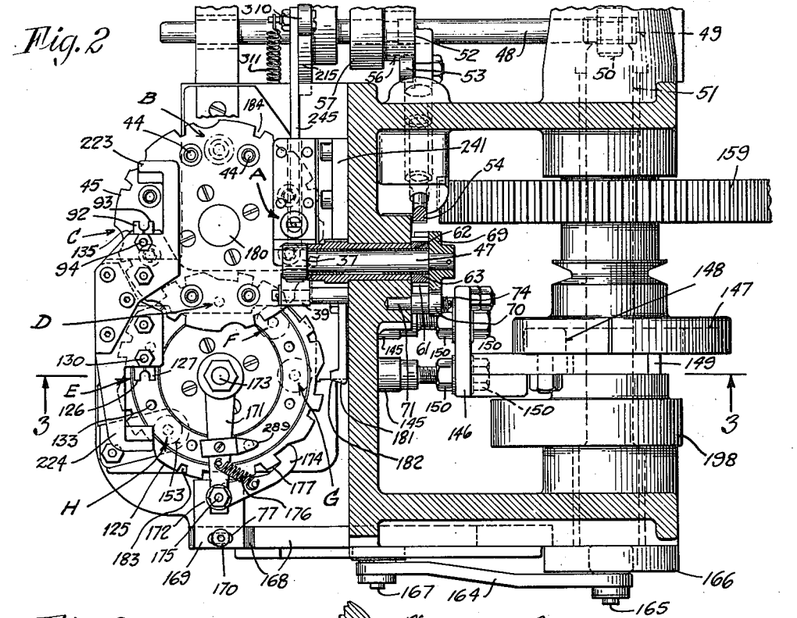
Fig. 2 is a sectional plan view taken approximately along the line 2—2 of Fig. 1.

The dielectric feed is driven by shaft 47 (Figs. 2 and 4), upon which feed roll 37 is mounted. Shaft 48 is connected through spiral gears 49 and 50 with the main operating shaft 51 of the machine. An eccentric cam 52 (Fig. 4) is adjustably mounted on collar 57 carried by shaft 48. Said eccentric operates cam roll 53 to reciprocate rack 54, spring 55 being provided to urge the roll against the eccentric. Eccentric 52 is adjustably mounted by means of a pivot 56, said pivot being integral with or attached in some suitable manner to collar 57 (Fig. 2). Eccentric 52 has an elongated arcuate slot 58 (Fig. 4), said slot being of sufficient size so as to encircle shaft 48 and allow movement of the eccentric about pivot 56. Set screws 59 and 60 are provided to adjust the position of the center of the eccentric relative to the center of shaft 48. In this manner, it is possible to vary the throw of the eccentric and therefore the length of reciprocation of rack 54 without changing the timing of the operation perceptibly.

Rack 54 engages gear teeth 61 of oscillatable collar 62, said collar being freely mounted on sleeve 63 (Fig. 2) and having an arm 64 integral therewith. Arm 64 has gripping roll 65 rotatably mounted thereon. The center of gripping roll 65 is eccentric relative to the center of stud 66 so that the center of the feed roll has an arcuate motion about the center of the stud. A spring 67 (similar to spring 74 shown in Fig. 2 for roll 70) is provided for rotatably urging the roll on said stud in the direction shown by arrow 68. As rack 54 moves to turn collar 62 in a counterclockwise direction (Fig. 4), roller 65 will tend to rotate counterclockwise so as to firmly grip collar 69, collar 69 being attached to shaft 47. The gripping takes place because of the eccentric mounting of roll 65 relative to its pivot 66 which causes the distance between the center of collar 69 and the center of the roll itself to become less, and therefore, the distance between the center of the roll and the face of collar 69 to become less. When the rack reverses its direction so that collar 62 is turned clockwise (Fig. 4), roll 65 will tend to be rotated in a clockwise direction, thereby increasing the distance between the center of the roll and the face of the collar 69 so as to release said collar. Thus, roll 65 serves as a pawl for operating the collar, yet it does not have its action limited by the position of teeth cooperating with the pawl. The lock for collar 69, serving to hold said collar in position as the rack 54 reverses, comprises an eccentrically mounted locking roll 70, said roll being fixed as at 71 (Fig. 2) to the frame of the machine. The center of stud 72 for said roll is eccentric relative to the center of the roll itself. A spring 74 is provided, tending to rotate the roll in the direction of arrow 75. When collar 69 is being moved counterclockwise (Fig. 4), roll 70 is rotated clockwise and thus the distance between the center of said roll and the face of collar 69 is increased, thereby unlocking collar 69 from roll 70. As the rack reciprocates in the opposite direction so that collar 62 is rotating clockwise, locking roller 70 will be urged in a counterclockwise direction, thereby holding and preventing collar 69 from rotating in a reverse direction. It thus is seen that reciprocation of rack 54 will cause roll 65 to grip collar 69 when collar 62 is rotated in a counterclockwise direction, thereby causing feeding rotation of shaft 47. Upon return movement of the rack giving a clockwise direction of rotation to collar 62, locking pawl 70 will come into action to hold the feeding shaft 47 against rotation. By suitable adjustment of eccentric 52, any desired amount of travel may be transmitted to the dielectric feeding shaft 47 so as to feed the correct amount thereof at each cycle of operation.

In order to assist in placing the blanked dielectric in an aperture 44, arm 245 (Figs. 2 and 17) is actuated by cam 215 carried on shaft 48. Said arm has a projection 246 which is movable upwardly against the blanked dielectric. Spring-pressed plunger 247 is compressed as the punch comes in contact with the dielectric. Projection 246 is brought against the dielectric about the same time as the punch. Cam 215 positively removes projection 246 from the blank prior to movement of the punch upwardly. Arm 245 can be pivoted and cam roll 310 held against the edge of the cam by a spring 311, this type of cam being known as an "open" cam. As punch 42 rises upwardly, compressed spring 216 behind punch 247 will positively eject the blanked dielectric from the end of punch 42. Punch 42 may have a slot 249 (Figs. 17 and 21) to accommodate collar 250 mounted on stud 244 carried by head 82. Blanking punch 42 is reciprocable in guide 242 which is inserted in plate 217 mounted on L-shaped bracket 241, said bracket being mounted on the frame of the machine by screws 240. After screws 240 have been removed, the punch can be turned so that slot 249 will allow removal of the bracket and assembly from the machine. Channel 218 in plate 217 (Fig. 7) is provided for passage of the dielectric.

Dielectric cup and pierce station

Figures 6, 7, 8, 17, 20, 21:
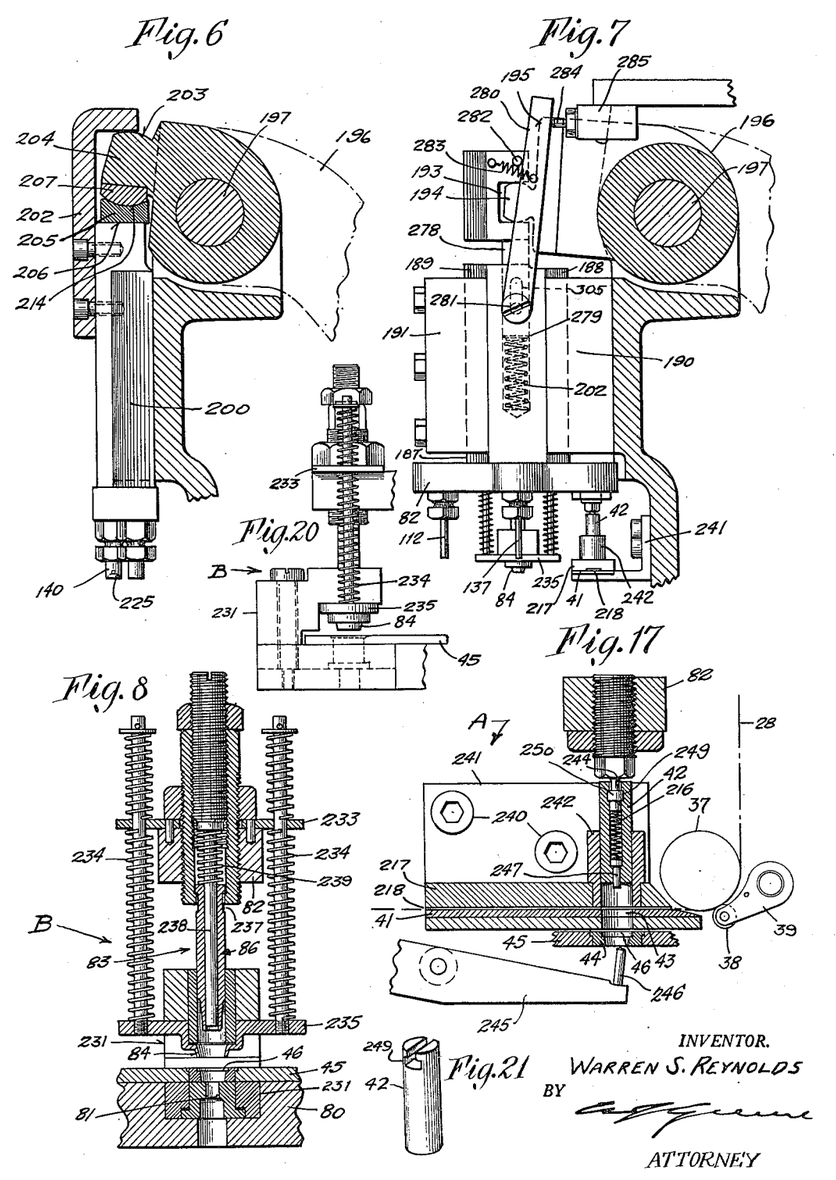
Fig. 6 is a fragmentary sectional elevation taken along the line 6—6 of Fig. 1, showing the construction of the coning and staking punches and their operating mechanism.
Fig. 7 is a fragmentary elevation partly in section taken along the line 7—7 of Fig. 1, showing the operating means for the left hand dial punches.
Fig. 8 is a detailed sectional view looking from the right hand side of the cup and pierce station along the line 8—8 of Fig. 1.
Fig. 17 is an enlarged fragmentary elevation of the dielectric cup blanking station A of Fig. 2.
Fig. 20 is a fragmentary side view of Fig. 8 looking from in front of Fig. 1.
Fig. 21 is an isometric view of the blanking punch of Fig. 17.

Dial 45 (Fig. 2) is indexed to bring the circular blanked dielectric to station B. As seen in Fig. 8, recess 46 is provided in dial 45 for holding a blanked dielectric disk. A plate 80 is located under the punch at this station, said plate having a bushing with an aperture 81 in subpress assembly 231 the approximate size of the hole to be punched in the dielectric. Head 82 carrying punch assembly 83 is moved downwardly at an appropriate time by the mechanism which will be described hereafter, the exterior holding punch 84 first contacting the blank in recess 46. Movement of crosshead 82 is transmitted through arm 233 to springs 234 and then to crossbar 235. Continued movement of head 82 will carry cupping punch 86 downwardly into aperture 44 so as to cup the dielectric. After the cupping punch is stopped upon completion of the cupping operation, cutting punch 238 then continues movement to cut a hole in the cup, clearance being provided at 237 to allow a floating movement of the punch assembly.

Figure 1:
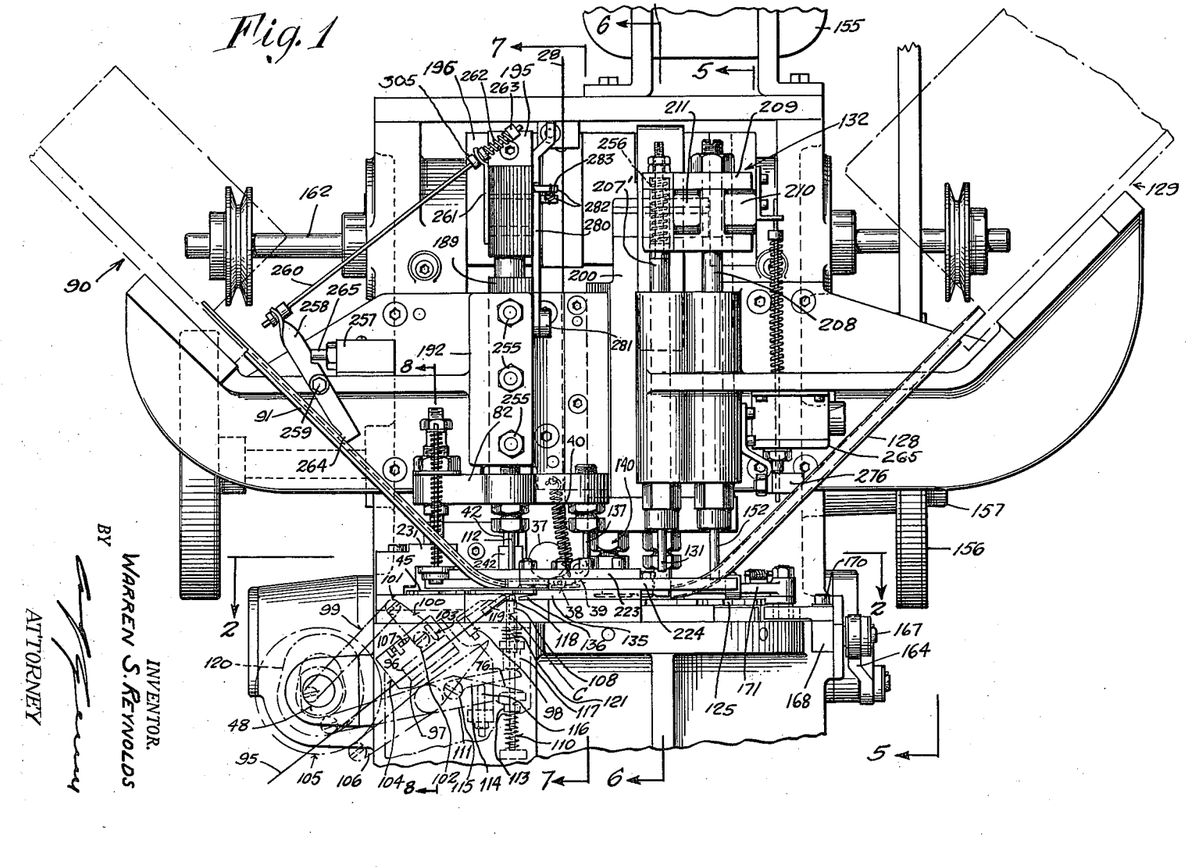
Fig. 1 is a front elevation with portions thereof broken away, the feed hoppers being shown fragmentarily and schematically.

It is to be noted that the dial is shown in Figs. 1 and 2 at a time when the punches are elevated and the dial is in an intermediate position between stations. Fig. 8 shows the dial when an aperture 44 is under the cup and pierce punch at station B. A solid subpress assembly 231 (Figs. 5 and 8) serves to hold the various parts just described.

Button, dielectric and wire assembly

The next indexing of the dial carries the cupped dielectric to station C, which is the button, dielectric, and wire assembly station. A hopper 90 of conventional form of the type shown generally in the patent to Butler, No. 774,827, may be used to furnish buttons 26 to chute 91, said chute having a slot for carrying buttons to fingers 92 and 93 at station C. The hopper should be of the type shown in said Butler patent, No. 774,827, or an equivalent, so as to insure the carrying of the buttons in the correct position to station C. Fingers 92 and 93 may be mounted on stud 93 (Fig. 2) on the frame.

The wire feed and cut-off mechanism together with the assembly operation at this station is described fully in copending application, Serial No. 559,218, filed October 18, 1944. Briefly, wire 95 is fed by means of gripper plates 96 and 97 (Fig. 1) mounted on sliding carriage 104. Clamps 98 are provided to hold the wire as grippers 96 and 97 are reversed in readiness for another feeding operation. Crank link 99 is operated from the end of shaft 48. Link 100 is pivoted at 101 to crank arm 99 and is pivoted at 102 to carriage 104. Projection 103 mounted on link 100 is operable to contact top gripper 97 and force it against fixed lower gripper 96 so as to clamp the wire therebetween. As shaft 48 rotates, link 100 is rotated clockwise (Fig. 1) around pivot 102, the carriage remaining stationary until projection 103 has contacted gripper 96 and the wires clamped between grippers 96 and 97. At this time, further movement of crank arm 99 will cause carriage 104 to move upwardly and carry a piece of wire toward station C. Holding clamp 98 comprising separable elements is released at this time so as to allow the wire to slide therebetween. After the wire has been fed and cut in the manner about to be described, cam 105 will operate on lever 106 and cause holding clamp 98 to grasp the wire. At this time, crank link 99 will start to reciprocate in the opposite direction, thus rotating link 100 counterclockwise about pivot 102. Rotation will continue until contact is made with adjustable screw 107 mounted on carriage 104. Reciprocation of crank link 99 then will be imparted to carriage 104 and carry it away from station C to a position in readiness to grasp the wire for another reciprocation toward the feeding station, rotation of link 100 having released grippers 96 and 97 from engagement with wire 95.

Rod 108 has a slot (not shown) in the top thereof to guide the wire so that it will enter the dielectric in the direction shown in Fig. 10 in readiness for a button 26 to be inserted into the dielectric cup. The slot allows upward movement of rod 108 about the wire. Upward movement of rod 108 is caused by spring 110 upon movement of the right end of pivoted arm 111 (Fig. 1) upwardly. Rod 108 continues upwardly until the top thereof touches the bottom surface of a button 26 located between fingers 92 and 93. During this same time, punch 112 has been descending with head 82 and touches the top of the button at approximately the same time rod 108 touches the undersurface of said button. Further movement of head 82 and punch 112 downwardly will carry the button between rod 108 and punch 112, toward the dielectric, said movement being allowed by spring 110. Pivoted lever 111 merely serves to release rod 108 so that it can move upwardly under the urgence of spring 110 at the correct time. As the dielectric and button are brought together, the previously fed piece of wire is suitably located between the button and dielectric and gripped therebetween, as seen in Fig. 11. At this time, end 76 of pivoted lever 111 is moving downwardly to contact collar 113, thereby positively moving rod 108 downwardly. End 76 of lever 111 then receives a further movement downwardly until pivoted arm 114, which is pivoted at 115 on lever 111, touches the top of adjustable abutment 116. Further movement of end 76 of lever 111 downwardly then causes rotation counterclockwise of arm 114 so as to cause movement of collar 117 upwardly. Rod 108 passes through collar 117. Upper edge 118 of collar 117 cooperates with the edge of the wire guide quill 119 so as to cut the wire at this point. End 76 of lever 111 then moves rapidly upward due to the shape of cam 120 so as to allow spring 121 to withdraw the cutter from its cutting position.

Figures 13, 16, 22:
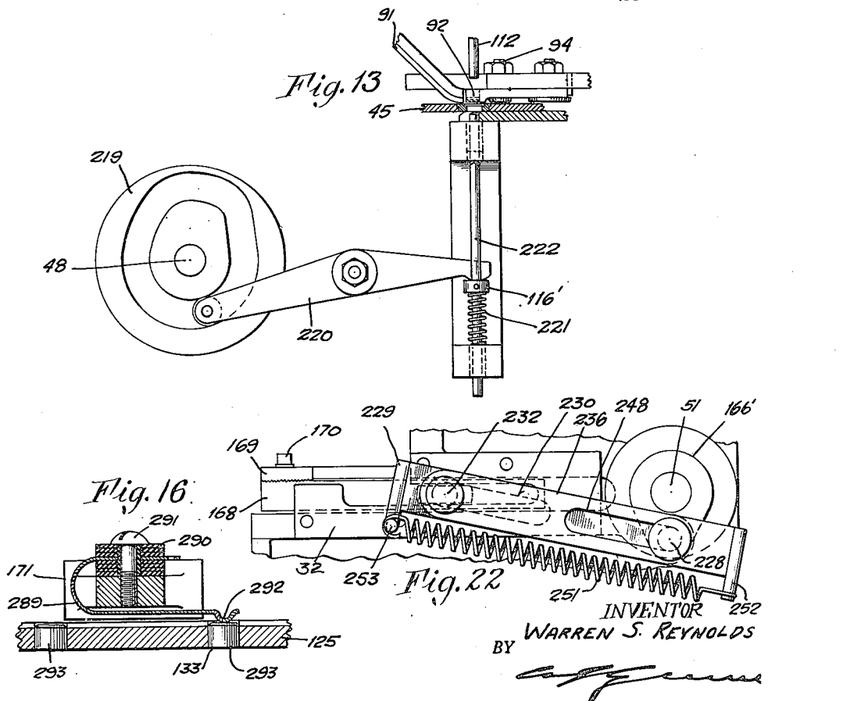
Fig. 13 is a modified form of the assembly mechanism located at station C for assembling primers without wires.
Fig. 16 is an enlarged fragmentary elevation of the testing switch of the right hand dial of Fig. 2.
Fig. 22 is a fragmentary view of a modified form of link drive for the dial indexing mechanism.

In the event a primer is being assembled which does not have a wire therein, the apparatus shown in Fig. 13 may be used in place of the wire feed assembly apparatus just described. It is necessary to guide the contact button from the feed track and fingers into position in the dielectric cup. Cam 219 is mounted on shaft 48 for operating lever 220 which is similar to lever 111. Said lever 220 allows spring 221 to move rod 222 upwardly at the appropriate time in the manner described for rod 108. The other parts in Fig. 13 are given the same reference numerals as those in Fig. 1. Operation is similar to that described previously except that no wire is fed or cut.

Final parts assembly station

Figure 14:
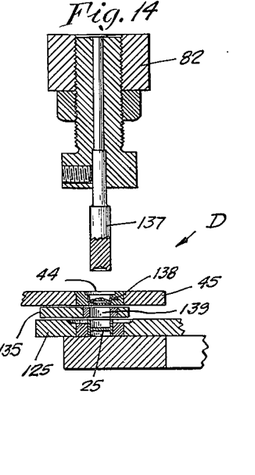
Fig. 14 is a view from the right through the common assembly station D of Fig. 1.
Figure 15:
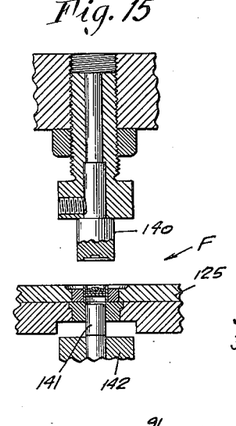
Fig. 15 is a view through the coning station F of Fig. 2 of the right hand dial.

The next indexing of dial 45 carries the assembled button wire, and dielectric to the final parts assembly station (Fig. 14). As the button, dielectric, and wire rotate to station D, wire end 28 (Fig. 11) will trail across guide plate 135 (Figs. 1, 2 and 14), said plate being beveled as at 136 to guide the wire and cause it to trail properly toward station D. It is possible to provide a track (not shown) in plate 135 to guide the wire to station D and insure proper location thereof across the cup at the assembly station and thereby positively prevent misalignment of the wire due to movement of the parts. This track can be a narrow arcuate slot on the line of center of rotation of apertures 44 in dial 45. The plate without a track will serve, however, to keep the wire in place so as not to be moved sideways by the primer body in dial 125 as the parts are rotated toward each other. Bracket 223 (Figs. 1 and 2) can be used to support chute 91 and bracket 224 to support chute 128.

Primer body 25 (Fig. 12) is fed to dial 125 at station E, the body being fed to fingers 126 and 127 through a suitable chute 128 from a conventional hopper diagrammatically shown at 129, said hopper properly arranging the primer bodies. Said hopper may be of the type shown at 90 or one similar thereto. Fingers 126 and 127 are fastened by stud 130 (Fig. 2) which is secured to the frame in a suitable manner. Dial 125 has suitable apertures 133 therein to receive the primer bodies. Punch 131 is operated by crosshead 132, which will be described hereafter, to carry a primer body from between fingers 126 and 127 into an aperture 133 in dial 125.

Work transfer dial 125 is rotated in synchronism with work dial 45 so that a primer body is brought underneath station D at the same time a button, dielectric, and wire assembly is brought to said point (Fig. 14). Assembly punch 137, carried by head 82, advances downwardly and engages the button, dielectric, and wire assembly 138 as seen in Fig. 14, carrying said assembly through aperture 139 in plate 135 into position in primer body 25.

Coning and staking stations

Figure 3:
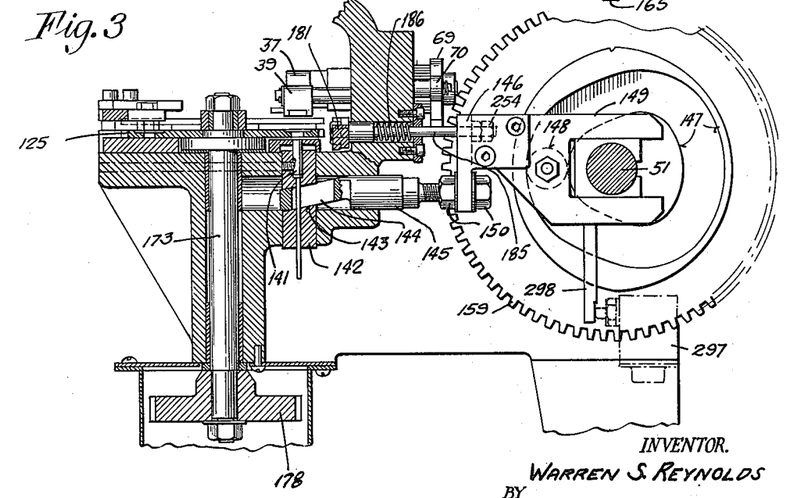
Fig. 3 is a fragmentary sectional elevation along the line 3—3 of Fig. 2.

The next indexing of dial 125 carries the assembly of the button, dielectric, wire and primer body to station F, or the coning station. The operation performed at this station partially turns over the upper walls of the primer body over button 26. Inasmuch as considerable work is done at this point and it is important to maintain the accuracy of dimensions, a positive support must be provided under the primer body as coning punch 140 advances downwardly. The anvil 141, or support for this purpose, is shown in Fig. 3 as applied to the staking station G. Said anvil is substantially identical to that used for the coning station, so the same description will apply to both. Coning punch 140 has an interior recess of the general shape shown in dotted lines 225 in Figs. 5 and 6. Anvil 141 is carried in the reciprocating holder 142 and is moved upwardly so as to enter into the primer body and to engage ledge 34 (Fig. 12) of the primer body at or before the time coning punch 140 has started to operate on the upper walls of the primer body. Reciprocating member 142 (Fig. 3) has an inclined slot or aperture 143, which is engaged by inclined cam 144, said inclined cam being located at the same angle relative to the horizontal as the margins of slot 143. Inclined cam 144 is reciprocated and may be integral with guide 145. As guide 145 is moved to the left (Fig. 3), reciprocating holder 142 and anvil 141 are positively moved upwardly similar to a wedging action. Guide 145 is reciprocated by crosshead 146 (Figs. 2 and 3) operated by box cam 147 through cam roller 148 attached to yoke 149. The guide and inclined cams 144 are adjustable by means of nuts 150. It thus is seen that there is a positive anvil support for the primer body at the coning station and also at the staking station, there being substantially identical anvils and operating mechanism at each station reciprocated by crosshead 146. After the primer assembly has been coned or partially closed, dial 125 indexes the assembly to the staking station G. Staking punch 151 (Fig. 5) descends and contacts the cone surface and flattens the same to the shape shown in Fig. 12, one of the anvils 141 having been reciprocated upwardly so as to support the bottom of ledge 34 before the staking punch starts to operate. The coning and staking punches are operated by a common slide which will be described hereafter. It is to be understood that the entire operation of closing may be done at one station and the second station omitted if desired.

Size and eject station

Following completion of the primer to the form of Fig. 12, dial 125 indexes and carries the primer to the size and eject station H. Size and eject punch 152 (Figs. 1 and 5) is moved downwardly and contacts the assembled primer in the dial and moves said primer downwardly through a die 153 in the frame of the machine, this die being of the correct dimension so as to size exteriorly the primer. The ejected primer passes through opening 154 into a suitable receptacle.

Driving mechanism

First, the general drive mechanism will be indicated and following this, the specific operation of the various punches and reciprocating parts described. A motor 155 (Figs. 1, 4 and 5) of any suitable type may be used to drive a pulley 156 (Figs. 1 and 4) located on countershaft 157. Gear 158 keyed to shaft 157 engages gear 159 keyed to main operating shaft 51. On shaft 51 are located the cams and eccentrics for operating the dial mechanism, the punch drives, the coning and staking anvils, and the dial locking means. Belt 160 (Figs. 4 and 5) is driven from pulley 161 (Figs. 4 and 5) on shaft 51 for the purpose of operating shaft 162, upon which are located the belts for driving the rotatable hoppers. Pulley 87 serves to guide belt 160 over shaft 157. One of the hopper belts is shown at 163 (Fig. 5) operating hopper 129. Shaft 51 also has located thereon spiral gear 49 (Fig. 2) for operating shaft 48, shaft 48 operating the dielectric feed and the wire feed mechanisms.

Transfer dial drive

Figure 4:
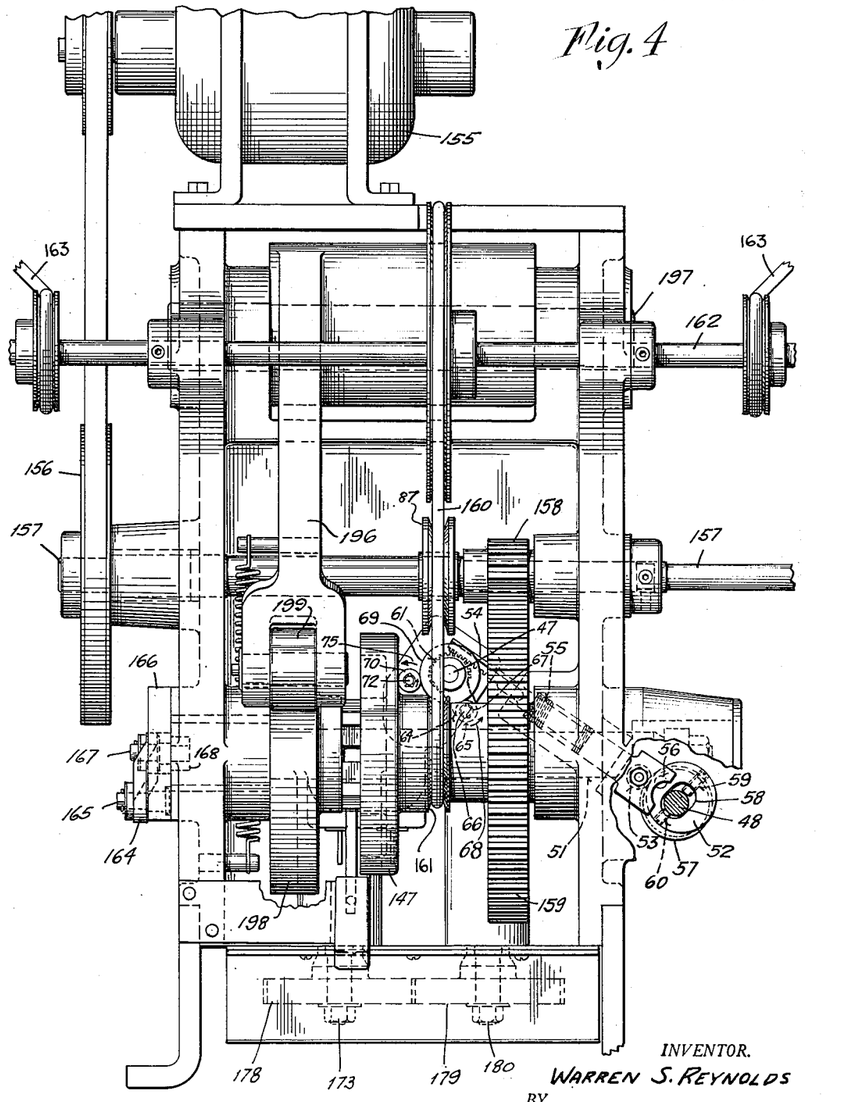
Fig. 4 is a rear view with portions thereof cut away.

Crank link 164 is pivoted at 165 to disk 166, said disk being connected to shaft 51 and rotatable therewith. The opposite end of crank arm 164 is pivoted at 167 to the pawl operating slide 168, said pivoted connection being of any suitable adjustable or fixed type. Pawl operating slide 168 has a block 169 adjustably mounted thereon and held in place by screw 170, there being provided an elongated adjustment slot 77 (Fig. 3). Guide plate 32 holds the slide 168 in place. The surfaces between block 169 and slide 168 may be serrated so as to lock the relative adjustment between these parts. Block 169 is connected to swinging arm 171 (Fig. 2) by means of a slidable connection 172, swinging arm 171 being freely pivoted on transfer dial shaft 173. Pawl lever 174 is pivotally mounted at 175 to the outer end of the swingable arm 171, spring 176 serving to urge the pawl toward the periphery of the transfer dial 125. Suitable teeth are provided on the exterior surface of the transfer dial 125 for engagement with the pawl, such as shown at 177 of Fig. 2. As arm 171 is oscillated in a clockwise direction, pawl 174 will engage a tooth as at 177 and rotate the work transfer dial 125 in a clockwise direction. Upon return movement of slide 168, pawl 174 will yieldingly move over the teeth and engage the next preceding tooth of the dial. Rotation of dial 125 is transferred to work transfer dial 45 by means of gears 178 and 179 attached to shaft 173 of dial 125 and shaft 180 of dial 45, respectively (Fig. 4). Reciprocation of crank link 164 thus indexes dials 125 and 45 in synchronism.

A modified form of link drive mechanism having provisions for yielding in the event of a jam in the dial transfer mechanism is shown in Fig. 22. Identical parts have the same numerals as those shown in Fig. 5. Disk 166' mounted on shaft 51 has pivot pin 228 attached to inner link 229 and positively drives said link. This link has an elongated slot 230 therein through which passes pin 232, said pin being attached to slide 168 and outer link 236. Outer link 236 has an elongated slot 248 through which pin 228 passes. Spring 251 is attached at one end to outer link 236 at 252 and at its other end to inner link 229 at 253. The spring tends to hold the pins 232 and 228 at the outer ends of elongated slots 230 and 248, respectively. In the event there is a stoppage in the dial indexing mechanism, spring 251 will give, and each of the pins will advance toward the opposite ends of their respective slots. By this construction, a yieldable connection is provided which will not protrude from the rear of the machine normally or when there is a stoppage and thus safeguard anything which might be close to the machine at that time.

The dials are locked with the work carrying apertures in their correct location relative to the operating stations by means of a locking yoke 181 (Figs. 2 and 3). Said yoke has a projection 182 for engaging one of the locking notches 183 of the dial 125. The opposite end of yoke 181 has a similar projection for engaging one of the corresponding locking notches 184 in transfer dial 45. Locking yoke 181 is attached to crosshead 146 by rod 185 (Fig. 3), spring 186 serving to urge the locking mechanism toward the dial so that in the event of a stoppage or jam, the locking means will not be moved positively toward the dial with a reciprocation of crosshead 146, nuts 254 being on the end of rod 185 and said rod being freely reciprocable in crosshead 146.

Button, dielectric and wire assembly punches

The dielectric blanking, cupping and piercing, and preliminary assembly thereof with the wire and button, and assembly of this sub-assembly with the primer body is performed by four punches carried by one operating slide. Head 82 carries the four punches just referred to and is, in turn, fastened to slide 189 (Figs. 1 and 7). Slide 189 may be of conventional dovetail type having inclined faces 188 and 187 engaged by gibs 190 and 191 held by bracket 192, said bracket 192 being fastened to the frame of the machine in any suitable manner. Gib 191 is adjustable by means of screws 255. The upper portion of dovetail slide 189 has a slot 193 therein, which is engaged by a ball-like projection 194 fastened to arm 195 of the main operating punch lever 196. The main operating punch lever 196 is pivoted on shaft 197 and is oscillated by main cam 198 mounted on shaft 51, cam roller 199 being interposed therebetween. It thus is apparent that oscillation of the main punch operating lever 196 will serve to reciprocate slide 189 and thereby carry dielectric blanking punch 42, dielectric cupping and piercing punch assembly 83, button assembly punch 112, and final parts assembly punch 137, toward and away from dial 45.

Coning and staking punch drive

Figure 5:
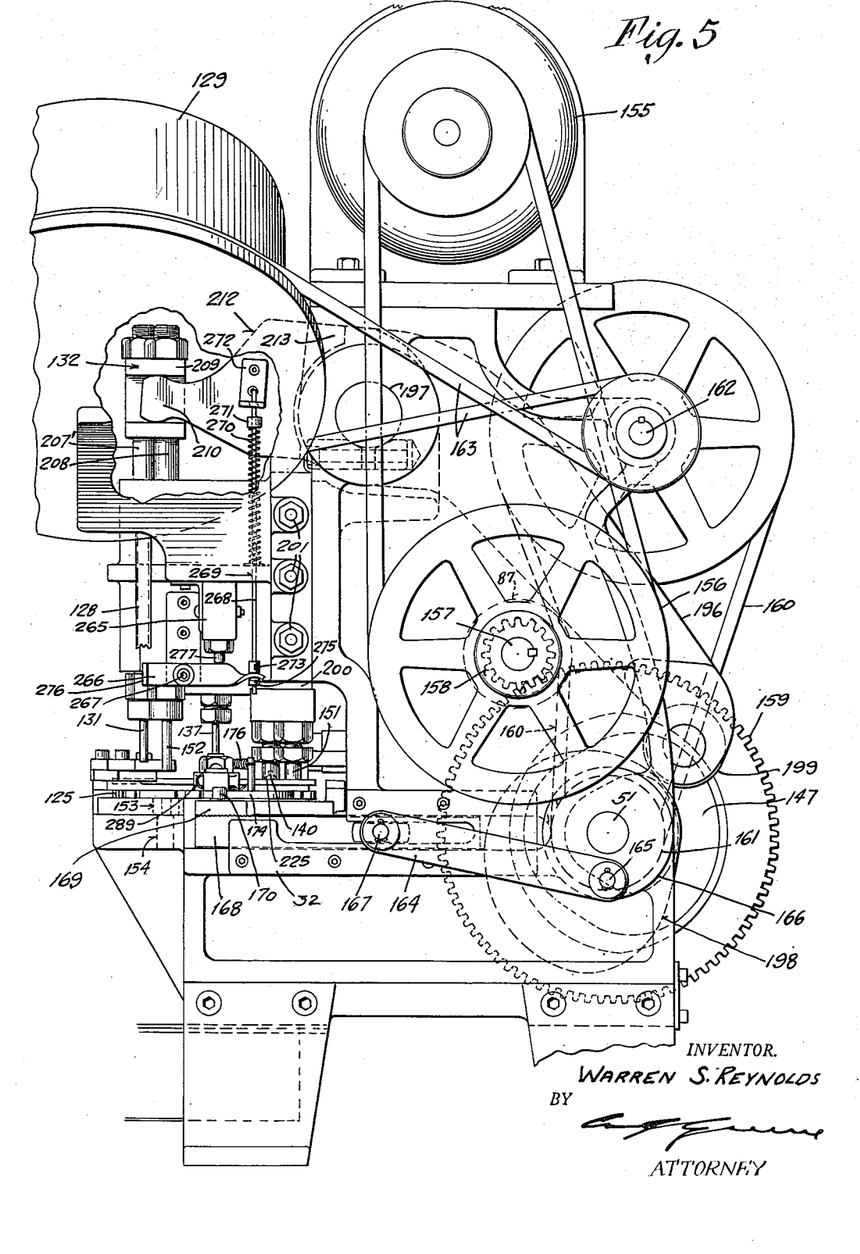
Fig. 5 is an end elevation partially in section taken in the direction and along the line 5—5 of Fig. 1, the hopper to the right of the line being shown fragmentarily.

The coning and staking punch at stations F and G are fastened to dovetail slide 200 (Figs. 1 and 6), said slide being of the same type as slide 189 and mounted in grooves having adjustable gibs. The adjusting screws for one of the gibs may be seen at 201 (Fig. 5). Bracket 202 is fastened to the front of slide 200 and serves as an upper member for engagement by semi-circular surface 203 of the drive member 204 fastened to punch operating lever 196. Saddle 205 is slidably mounted on surface 206 of the slide 200 and has engaged therewith a mating semi-circular saddle 207 which is slidable on surface 214 of the operating projection 204 of lever 196. By employment of this construction, arcuate stroke of projection 204 is provided for and the relatively heavy loads necessary for the coning and staking operations are transmitted to the slide from the operating lever 196 on surfaces of considerable area as compared to the usual ball and straight surface contact.

Primer body delivery punch and ejection punch

The primer body delivery punch 131 (Figs. 1 and 5) and size and eject punch 152 are operated from crosshead 132, said punches being attached to operating rods 207 and 208, said rods being reciprocable in crosshead 132 and urged downwardly by a spring such as 256. Plate 209 may be fastened in any suitable manner to F-shaped crosshead 132. Fingers 210 and 211 are engageable in slots in crosshead 132, said fingers being integral with bracket 212 (Fig. 5) fastened to punch operating lever 196 at 213. Oscillation of the punch operating lever thus will cause vertical reciprocation of primer body delivery punch 131, and size and eject punch 152. It is seen that punch operating lever 196 oscillates about shaft 197 to reciprocate slide 187 carrying the punches operating on the components in transfer dial 45 to reciprocate slide 200 carrying the coning and staking punches, and to reciprocate crosshead 132 carrying rods for operating the primer body delivery, size, and eject punches. The slides and punches are operated in synchronism with the movement of the transfer dials and the dielectric wire feed mechanisms.

Stop mechanism

Automatic stop devices may be provided so as to stop the machine in the event buttons fail to feed in chute 91, primer bodies fail to feed in chute 128, a jam occurs in the assembly operation in the left hand dial so as to prevent downward movement of crosshead 82, and to stop the machine in the event an open circuit is detected in a primer after it has been finally assembled and completely shaped.

Button chute detector

Referring to Fig. 1, a normally closed switch 257 which may be of the type known as a "Microswitch" is mounted on the frame of the machine. A pivoted lever 258 is pivoted at 259 to the frame. Rod 260 is fastened at one end to the pivoted lever 258 and at the other end to bracket 261 mounted on reciprocating slide 187. Spring 262 bears against collar 263 fastened to rod 260. Collar 305 is fastened to rod 260. As the slide 196 is reciprocated, the upper end of the rod is given a complex motion which serves to oscillate pivoted lever 258. If there is a button underneath the end 264 of pivoted lever 258, the lever will be prevented from moving far enough to operate button 265 of the "Micro-switch," lever 258 being oscillated as the slide moves upwardly, spring 262 allowing pivoted lever 258 to be stopped by a button. In the event there is no button under end 264, lever 258 will be oscillated sufficiently far to operate "Micro-switch" 257. The circuit in which this switch is contained will be described hereafter.

Primer body chute detector

Referring to Figs. 1 and 5, normally closed switch 265 is mounted on the frame of the machine. Pivoted lever 266 is mounted at 267 on the frame. A rod 268 passes through an aperture 269 in the frame of the machine. Spring 270 bears against collar 271 mounted on the upper end of the rod, tending to raise the same. Bracket 272 is mounted on oscillating arm 212. Collars 273, 275 hold the lower end of rod 268 in relation to one end of pivoted lever 266. The outer end 276 (Figs. 1 and 5) of the pivoted lever is arranged to contact a primer body in the chute 128. As the arm 212 is oscillated so that bracket 272 moves upwardly, spring 270 will tend to move rod 268 in an upward direction. The presence of a primer body in the chute under end 276 of the pivoted machine will limit the upward course of rod 268 such as to prevent operation of button 277 of the "Micro-switch."

Left hand dial stop mechanism

In order to provide a stop for the machine in the event any of the punches carried by crosshead 82 are prevented from movement all the way downward and thus prevent damage to the machine or tools, a stop mechanism is provided to stop the main operating motor of the machine. Referring to Fig. 7, lever 196 serves to oscillate projection 194 which, in turn, reciprocates plunger 278 in a vertical direction. Spring 202 located in aperture 279 bears against the underside of plunger 278 and urges said plunger upwardly until the bottom of elongated slot 305 is stopped by pin 281, said pin being carried by slide 189. Lever 280 (Figs. 1 and 7) is fastened to pin 281. In the event slide 187 is stopped before complete downward travel occurs, plunger 278 will move downwardly relative to slide 187 and pin 282 will be moved down the surface of arm 280 so as to overcome spring 283 and cause the upper end of arm 280 to push plunger 284 of "Microswitch" 285, inwardly and open the switch. If there is no relative movement between plunger 278 and slide 187, there will be no movement of arm 280 relative to the plunger of the "Microswitch" so that the switch will not be operated.

Primer wire testing

In order to test continuity of the primer wire and to stop the machine in case the wire has been broken or is missing, a contact arrangement shown in Fig. 16 is carried on swinging arm 171. Said contact comprises a U-shaped contactor 289 mounted on arm 171 by suitable insulators 290 and screw 291. The contact portion 292 is arranged relative to the apertures 133 in the dial 125 so that it will be in registry with a primer 293 carried in one of said apertures as the dial is being indexed. The circuit is arranged, as will be hereafter described, so as to cause current to pass through said contactor only when the contact is in position over a primer in the dial. The method of operation of this detector will be described in the next section.

Machine stop circuits

Figure 18:
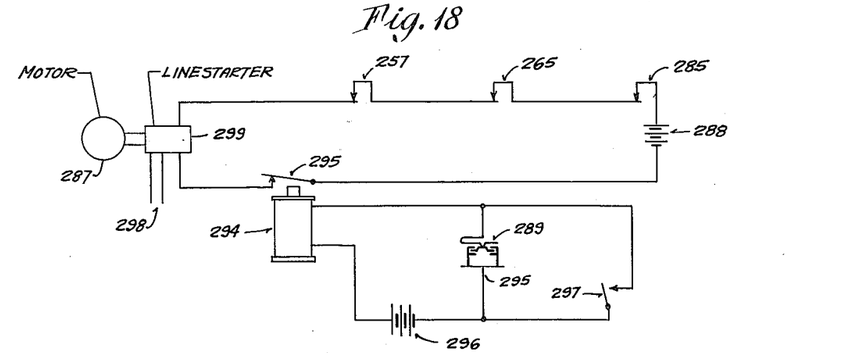
Fig. 18 is a circuit diagram of the stop switch mechanism.

One form of circuit which may be used for the machine stop is shown in Fig. 18, wherein the normally closed "Micro-switches" 257, 265 and 285 are shown in the holding coil circuit of a conventional line starter. The source of power is indicated at 288. This source of power may be a battery or may be taken directly from the main power leads 298. Power is supplied to the line starter 299 through leads 298 and from the line starter to the machine operating motor 287. Normally open relay 295 has a solenoid 294 which serves to keep the switch 295 closed whenever the circuit supplying the solenoid is energized. As swinging arm 171 is being operated to index right hand dial 125, contactor 289 will be over the top of a primer. The dial itself may be grounded through lead 295 or connected to the other side of the source of power 296 in any suitable manner. Power flowing from source 296 through solenoid 294 and through a perfect primer will cause relay 294 to be energized to close switch 295 or to cause the same to remain closed. "Micro-switch" 297 is connected in parallel with the primer contactors 289 and 295. As the swinging arm is being reversed after an indexing of the dial, contactor 289 will be removed from a primer. In order to prevent switch 295 from opening, switch 297 is closed so as to keep the circuit through the solenoid. After switch blade 289 has contacted the next primer, switch 297 is reopened so that the test is made for continuity of the wire in the primer. In the event there is no wire in the primer, solenoid 294 will be de-energized and switch 295 opened so as to stop the driving motor. Switch 297 is operated in correct time with swinging arm 171 by pin 298 (Fig. 3).

Figure 19:
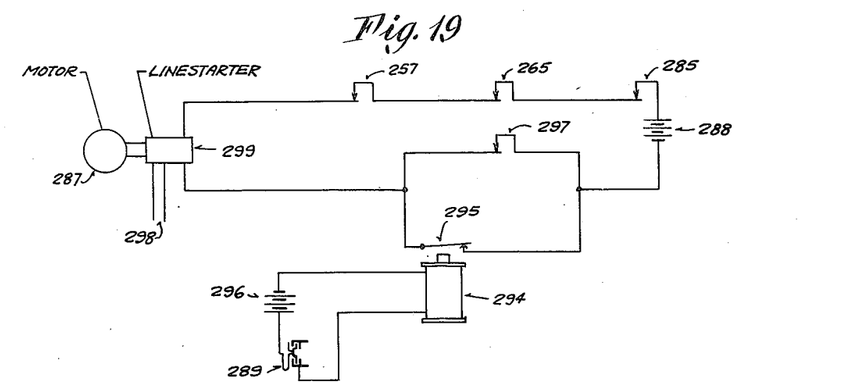
Fig. 19 is a modified form of the stop switch circuit.

A slightly different circuit arrangement is shown in Fig. 19, wherein "Micro-switch" 297 is in parallel with switch 295 instead of being in the auxiliary circuit as shown in Fig. 18. Switches 257, 265 and 285 are normally closed. A source of power is indicated at 288 for the holding circuit to the line starter. Power is supplied through leads 298 to the machine operating motor 287. When the swinging arm moves contact 289 over a primer which has a wire therein, solenoid 294 will be energized so as to cause switch 295 to be closed. At this time, "Micro-switch" 297 is opened by pin 298 so that the circuit is completed through 295. If the primer does not have a wire therein, solenoid 294 will not be energized and switch 295 will not be closed so that the circuit from the holding coil to the line starter will be broken.

Figure 23:
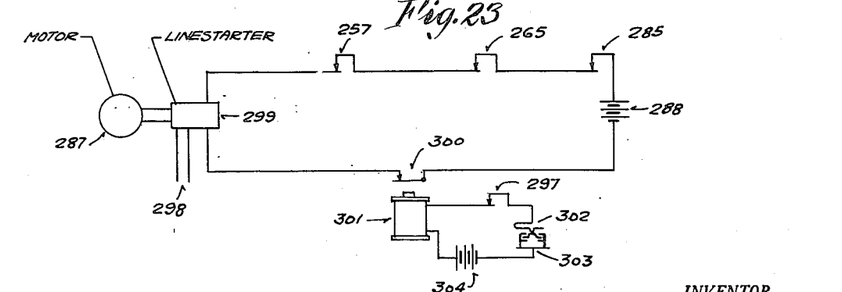
Fig. 23 is a modified circuit diagram for use in testing for a short circuit or a primer made without a wire.

In the event it appears desirable to test for a short-circuit condition, for example, when a primer is being assembled of the type not having a wire, the circuit shown in Fig. 23 may be used. In this circuit, normally closed switches 257, 265 and 285 are in series with the holding coil of the line starter 299 and source of power 288. Relay switch 300 is normally closed. Solenoid 301 is connected in series with switch 297, contactor 302, contactor 303, and source of power 304. When the contactor 302 is over a primer in the dial and the primer is located between contactors 302 and 303, "Micro-switch" 297 is arranged to be closed. In the event there is a short circuit between the button and the primer body, a source of current will flow through solenoid 301 and open switch 300 so as to break the circuit from the holding coil to the line starter. If the primer is good and there is no short circuit, there will be no circuit completed to solenoid 301 when switch 297 is closed and the primer is located between contactors 302 and 303.

*Summary*

The operation of the machine will be briefly given. Motor 155 drives main shaft 51 through gears 158 and 159. The hoppers are driven from shaft 162 which is connected by belt 160 with main shaft 51, hopper 90 feeding buttons into chute 91 and hopper 129 feeding primer bodies into chute 128. Prior to the downward movement of the punches, the dielectric feeding movement operated from shaft 48 has indexed roll 37 to feed a fresh portion of dielectric blank to station A. Downward movement of the punches will cut a circular blank of dielectric at station A. At station B, a previously blanked dielectric is cupped and pierced by the punch arrangement shown in Fig. 8. At station C, a button held in fingers 92 and 93 is assembled with a cupped and pierced dielectric transferred previously from station B. During this operation, a piece of wire is fed between the button and the cup so as to be properly located therebetween and said wire is cut off by the cutter 118. The punch at station D carries a button, dielectric and wire assembly, which has just been transferred from station C, into a primer body which has been moved from station E of dial 125 thereunder in synchronism with the movement of dial 45. The assembled button, dielectric, wire and primer body which have just been moved to station E are coned by punch 140 carried on slide 200, said slide being reciprocated by movement of punch operating lever 196 (Fig. 6). The coned primer assembly which has just been moved to station G is flattened and staked by punch 151 carried by slide 200. The completed primer assembly which has arrived at station H is forced through a sizing die and ejected from the device by punch 152 which is reciprocated by crosshead 132, through bifurcated fingers 210 oscillated by punch operating lever 196.

What is claimed is:

1. In a machine of the character described, two synchronously indexable work-holding dials having work-holding apertures therein; means to feed dielectric; means to blank dielectric and place said blanked dielectric into apertures in the first of said dials; means to shape said dielectric to cup form in said first dial; means to sub-assemble said shaped dielectric with a contact button in said first dial; means to feed a primer body to a work-holding aperture in the second of said dials; means to transfer said sub-assembly from the first dial to a primer body in said second dial; and means to complete the assembly to final form in said second dial.

2. In a machine of the character described, two synchronously indexable dials having work-holding apertures therein; means to feed dielectric; means to blank dielectric and place said blanked dielectric into apertures of the first of said dials; means to shape said dielectric to cup form with an aperture in the center thereof; means to sub-assemble said shaped dielectric with a contact button and wire in said first dial; means to feed a primer body to one of the apertures of the second of said dials; means to transfer said sub-assembly from the first dial to a primer body in said second dial at a common operating station; and means to complete the assembly to final form in said second dial.

3. In a machine of the character described, two synchronously indexable dials having work-holding apertures therein; means to feed dielectric strip; means to blank said dielectric and place said blanked dielectric into apertures in the first of said dials; means to shape said dielectric to cup form with an aperture in the center thereof; means to sub-assemble said shaped dielectric with a contact button and wire in the first of said dials; means to feed an open-ended primer body to one of the apertures of the second of said dials; means to transfer said sub-assembly from the first dial into one end of a primer body in said second dial at a common operating station; and means to secure said sub-assembly in said primer body in said second dial so as to complete the assembly to final form.

WARREN S. REYNOLDS.

REFERENCES CITED

The following references are of record in the file of this patent:

UNITED STATES PATENTS

| Number | Name | Date |
| --- | --- | --- |
| 272,511 | Angell | Feb. 20, 1883 |
| 279,497 | Orcutt et al. | June 12, 1883 |
| 1,053,694 | Anderson | Feb. 18, 1913 |
| 1,091,136 | Hilt | Mar. 24, 1914 |
| 1,726,229 | Kantor | Aug. 27, 1929 |
| 2,225,710 | Norris | Dec. 24, 1940 |
| 2,324,925 | Hallowell | July 20, 1943 |
| 2,373,582 | Kuehl | Apr. 10, 1945 |